United States Patent [19]

Thicthener et al.

[11] Patent Number: 5,721,047
[45] Date of Patent: Feb. 24, 1998

[54] POLYMERIC MOLDINGS REINFORCED WITH TOWS OF FIBERS

[75] Inventors: Edward Philip Thicthener, West Lakes Shore; Peter John Hastwell, North Adelaide, both of Australia

[73] Assignee: Applied Research of Australia Pty Ltd, South Australia, Australia

[21] Appl. No.: 378,078

[22] Filed: Jan. 25, 1995

Related U.S. Application Data

[63] Continuation of Ser. No. 81,362, filed as PCT/AU92/00585, Oct. 30, 1992, abandoned.

[30] Foreign Application Priority Data

Nov. 1, 1991 [AU] Australia ............... PK9225

[51] Int. Cl.⁶ ................................ B29C 70/52
[52] U.S. Cl. ............. 428/368; 156/166; 156/180; 264/104; 264/137; 264/145; 264/136; 405/259.1; 428/379
[58] Field of Search ............... 264/104, 135, 264/136, 137, 145, 157; 156/166, 180; 405/259.1; 428/368, 379

[56] References Cited

U.S. PATENT DOCUMENTS

| 3,269,883 | 8/1966 | Shulver et al. ............... 156/166 |
| 3,651,188 | 3/1972 | Wolf . | |
| 3,960,629 | 6/1976 | Goldsworthy ............... 156/180 |
| 4,816,331 | 3/1989 | Rau et al. ............... 264/136 |
| 5,114,516 | 5/1992 | Pilling et al. ............... 156/166 |
| 5,152,945 | 10/1992 | Thicthener et al. ............... 264/136 |
| 5,156,787 | 10/1992 | Booher ............... 156/180 |
| 5,324,377 | 6/1994 | Davies ............... 156/166 |

FOREIGN PATENT DOCUMENTS

| A56990/90 | 12/1990 | Australia . |
| A32379 | 1/1980 | European Pat. Off. . |
| A3248658 | 12/1982 | Germany . |
| 2108900 | 5/1983 | United Kingdom . |

OTHER PUBLICATIONS

PCT International Search Report (PCT/AU 92/00585).
Resistivity Behavior of Filled Electrically Conductive Crosslinked Polyethylene by M. Narkis & A. Vaxman in Journals of Materials Science 20 (1985).
Journal of Applied Polymer Science, vol. 29, pp. 1639 to 1652 (1984).

*Primary Examiner*—Mathieu D. Vargot
*Attorney, Agent, or Firm*—Watts, Hoffmann, Fisher & Heinke

[57] ABSTRACT

Discrete carbon or other electrically conductive fibers are added to a fluid formulation of settable resin in a bath, and a number of tows of non-conductive fibers, for example glass, are drawn through the bath, entraining and partly aligning the conductive fibers and being wetted by the resin. The tows are then bunched into a bundle, causing most of the conductive fibers and concentration zones to render the moulded product conductive to electrostatic charge.

20 Claims, 4 Drawing Sheets

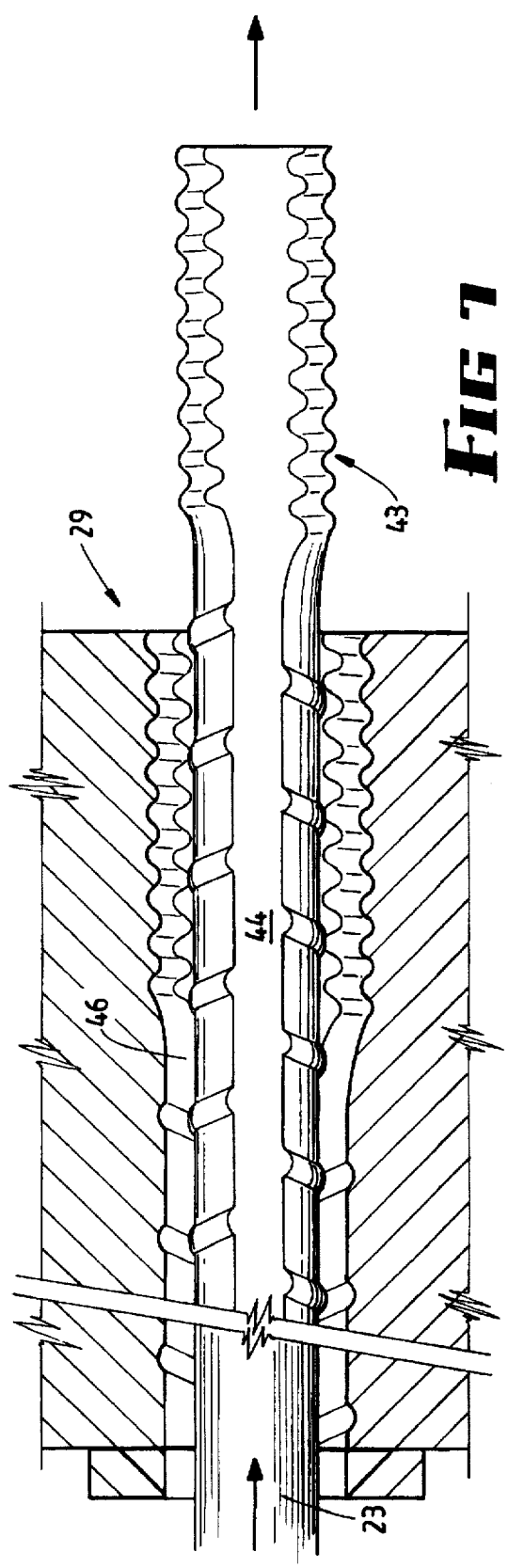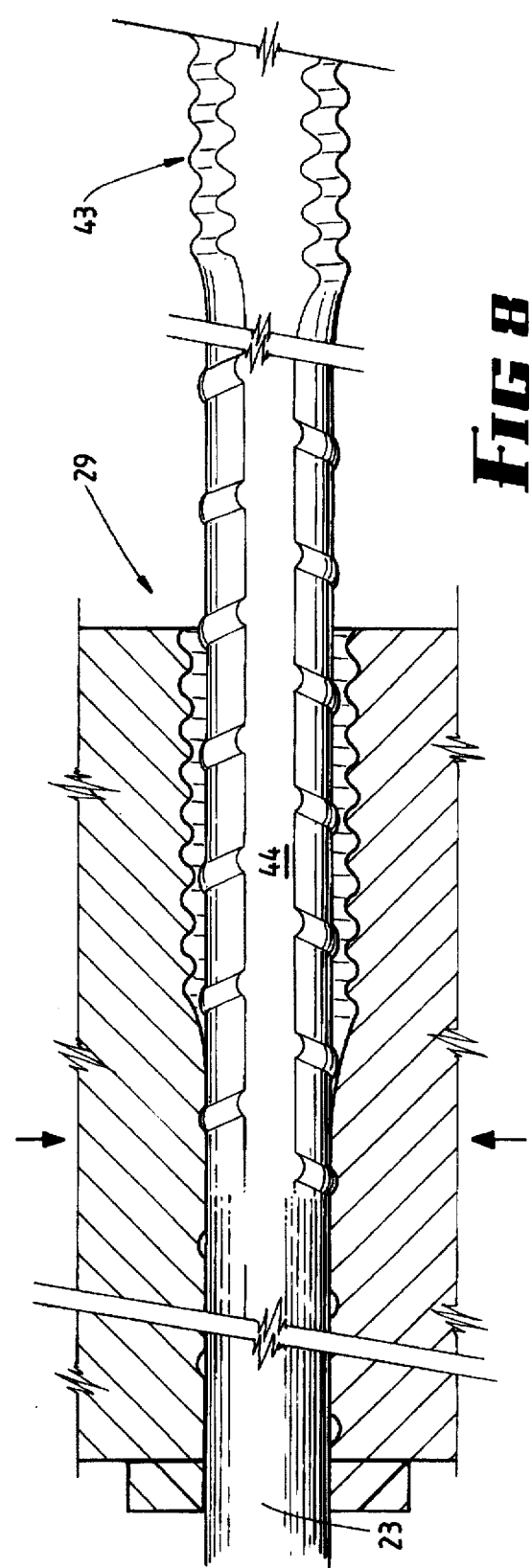

POLYMERIC MOLDINGS REINFORCED WITH TOWS OF FIBERS

This application is a continuation of application Ser. No. 08/081,362, filed as PCT/AU92/00585, Oct. 30, 1992, now abandoned.

This invention relates to a further extension of Australian Patent 631881 (56990/90) (U.S. Pat. No. 5,152,945) entitled "High strength fibre reinforced polymeric fasteners having threads for example a nut and bolt", being the subject of an application by the same Applicant.

BACKGROUND OF THE INVENTION

That said patent was directed primarily to a means for and method of forming a rock bolt of fibreglass reinforced plastics material (particularly a polyester formulation), but although conductivity was mentioned, it did not disclose any means or method of rendering a rock bolt conductive, and in use prior art methods to do so were tried, but these did not achieve the standard of quality, nor the economy of manufacture sought by the inventors. In many applications, for example coal mining or petrochemical, conductivity of bolts is a necessity to guard against an electrostatic surface charge which upon discharge may cause explosion of hydrocarbon gases. Conductivity is also a requirement for certain polymeric pipes, tanks and other containers.

This invention therefore, is directed primarily to a means for and method of forming a conductive product of otherwise non-conductive fibre reinforced plastics, but also includes further improvements in the means and method of forming rock bolts.

Carbon black is often promoted for use as a conductor, because of its low cost, but its use is deleterious if in conjunction with polyester resin, absorbing the resin promoter, reducing tensile strength, and increasing viscosity. Quantities of discrete graphite fibres as low as 3% w/w of the resin have been proposed, but graphite (or carbon) fibres are very expensive, and quantities as low as 2% when uniformly distributed, (in prior art tests) have resulted in a resistivity of more than $10^5$ ohm-cm, which, although within required limits, may be too high for safety in some instances.

An object of this invention is to provide improvements whereby a much lower resistivity (higher conductivity) can be achieved than heretofore, utilising very small quantities of discrete conductive fibre (carbon, which includes graphite, stainless steel and others known in the art).

In an important aspect of the invention, small quantities (less than 2% and in some cases less than 0.5%) of conductive fibres are added to a fluid resin mix through which otherwise non-conductive reinforcing fibres are drawn, the conductive fibres being for example carbon or metal fibres being of 6-12 microns in diameter and not more than a few centimeters in length (generally 6 mm long). In this invention, the fibres have a high aspect ratio, having a length at least two orders higher than diameter. (12 micron fibres need to exceed 1.2 mm in length.) This small quantity does not have a deleterious effect upon the resin strength or manufacturing process, but surprisingly does provide sufficient conductivity to meet requirements (if of course the carbon fibre is of the conductive type). The resistance is less by at least one order than the resistance achieved in prior art applications with similar quantities of fibres (in one rock bolt example 4.5K ohms compared with 500K ohms). This has been traced to a concentration increase of the conductive fibres where they are partly separated by non-conductive tows of fibreglass.

In this invention, a method of forming an electrically conductive product of non-conductive fibre reinforced plastics characterised by entering a mix of fluid but settable plastics material and discrete conductive fibres into a bath in a weight ratio not exceeding 2% weight of conductive fibres, said conductive fibres having a mean aspect ratio exceeding 100, drawing a plurality of tows of non-conductive reinforcing fibres through said bath and over a deflecting surface in said bath to expel air therefrom, wet said tows with said fluid resin, and entrain some of said conductive fibres, bunching said wetted tows into a bundle, applying said bundle to a shape forming surface, and retaining said tows in contact with said shape forming surface while said resin sets.

Further in the invention, an embodiment comprises forming a conductive rock bolt by drawing a bundle of tows of reinforcing fibreglass strand through a bath containing a fluid but settable resin and short lengths of small diameter conductive fibres suspended in the resin in a concentration not exceeding 2% by weight, passing the bundle between bolt forming recesses in an open die, closing the open die and subjecting the wetted tows to heat, and to a projected pressure (usually exceeding 500 psi (3500 kPa) for a viscosity of 5,000-10,000 centipoise) until set, opening the die and removing the set rock bolt in an endwise direction from the die recesses thereby drawing the bundle of unformed tows further through the bath and open into the die, and subsequently severing the rock bolt from the bundle of tows.

Still further, conductivity can be improved if the spools of fibres include one or more spools of conductive fibre, eg carbon fibre, which will give a continuous conductivity for the length of the product being moulded. Other conductive fibres which can be utilised include copper, stainless steel or vacuum metallised fibre glass.

The applicant's aforesaid specification disclosed a considerable advance over prior art in respect of production of fasteners. Its features included a U-shaped recess in a moulding die which had parallel inner side walls, and a second moveable part of the die having outer side walls which slidably engaged the parallel inner side walls of the recess and had contours which corresponded with contours in the U-shaped recess and to form the threads. That arrangement proved to be a basic advance over prior art previously known to the Applicant, and successful products have been produced wherein the threads withstood considerable forces which exceeded the capacity of corresponding threads available in prior art references as far as is known.

At the time of making that invention, it was deemed important to insert a threaded male insert into one end of the wetted coherent cable of reinforcing strands while in the die and when the die was closed so as to increase the diameter of the threaded end and cause some of the fibres to deflect into the matching contours of the dies. Indeed an effort was made to get the fibres as close as possible to the surface of the thread which was being moulded. An attempt was also made to utilise a smooth wall dowel to force the expansion at the threaded end.

The method which was used at that time incorporated severing the downstream end of the cable of wetted fibres after closing the die, and applying relatively low pressure to the cable to urge the flow of filled resin into the thread forming contours of the die, this being aided by the inclusion of a dowel or a threaded insert. Certain problems have been encountered however with that technique, the most important being that it is necessarily a slow technique and not suitable for production purposes. If a threaded insert is used, experience has indicated that some reinforcing fibres may become bi-directional instead of linear, and thereby lose some of their effectiveness. The tensile strength of a bolt is largely influenced by the number of unidirectional fibres. However there are other very important technical difficulties to be overcome which are in addition to the difficulty of providing a method of production which would be viable.

These difficulties firstly include an unexpected tendency to extrude both resin and fibres which limits pressure on the cable while the resin sets, and if there is a large number of fibres, the die closure pressure must be high. In this invention at least one of the ends of the die may be provided with closure means which will effectively inhibit the extrusion of the fibres and excessive amounts of resin from the die when pressure is applied so that high pressure can be imparted to the product. The closure can be effected in one of three ways:

(a) If the thread is being formed at the downstream end, the die is provided with pinching means which will pinch the end of the wetted cable where it projects from the downstream end of the die to greatly reduce its effective diameter and this will prevent expulsion from that end both of the resin and of the reinforcing fibres.

(b) Clamping the shank portion of previously moulded rock bolt (for example) at the downstream end of the dies.

(c) If as sometimes will be the case, the thread is formed intermediate the ends of the die (subsequently severed to form two rock bolts for example) the requirement of high pressure is reduced and effective closure can be achieved by forming a reduced diameter portion of the workpiece at the upstream end so that, upon curing, the reduced diameter portion so formed becomes the tail end of a previously moulded workpiece when the workpiece is progressed through the die, and when clamped by matching surfaces of the die will provide a closure at the downstream end to prevent extrusion of the resin from that end.

In both instances, pinching (which includes clamping of already set resin) may be provided at both ends of the die, and this enables high pressure to be applied to the resin before it sets.

Another major difficulty which was encountered previously had been the development of air pocket inclusions within the workpiece due to entrainment of air in the resin mix wet out bath, and separation of tows in a bundle during moulding, and these had the effect of reducing the effective cross-sectional area of the moulded workpiece with a consequential loss of torsional strength, in some cases this being so marked as to make the product unacceptable. Torsional strength is required when torque is applied to a nut during installation, pretensioning the bolt. Obviously air pocket inclusion can be reduced by increase of pressure but this was not originally deemed practical because of the abovementioned expulsion of both fibres and resin. In an embodiment of this invention however, because the ends of the die may be closed against expulsion of resin and fibres, it becomes possible to increase pressure to as much as (2000 psi or 14000 kPa) to effect flow of resin from the body of the wetted cable into the contour recesses of the die, without carrying very much filler material with it. Thus not only were the threads and deformation increased in strength by the application of high pressure, but at the same time air inclusion was reduced and its deleterious effect was reduced.

If a rock bolt for example is produced by the method disclosed in our previous Patent Application, even though the diameter of the threaded end may be greater than the diameter of the rest of the bolt shank, nevertheless the weakest part is likely to be the threads themselves, notwithstanding that some of the reinforcing strands have been forced to follow the contours of the thread. The shank is normally much stronger than the threads and therefore can be of smaller diameter, and the resin contained in the shank can include a considerable amount of filler, this being desirable from an economic point of view because of the low cost of filler compared to the high cost of resin. In a typical example, 100 parts of the mouldable mix may contain 50 parts of resin and 50 parts of filler by weight, the filler for example being calcite or talc or aluminium trihydrate. However the filler has the effect of reducing the strength of the resin, and therefore if the threads can be formed to contain little or no filler, they can receive added strength, and one of the difficulties in the previously described method was that of achieving an increase in thread strength by reduction of filler. In this invention, that difficulty may be overcome to some extent and the thread diameter is accurately controlled by high pressure being applied to the wetted cable, thereby causing resin to flow into the larger diameter thread forming recess of a die. The fibres function to a large extent as a filter and reduce the amount of filler material which flows into the thread forming recess. This effect can be controlled by varying the particle size of the filler, a greater filtering effect occurring with larger particle sizes.

However the thread formed by the filtering method alone was still much weaker than the shank of the bolt, notwithstanding a smaller diameter shank, and in one experiment a bolt formed from a 1:1 mixture of fibreglass and filled polyester resin had a shank tensile strength of 16 tonnes but the thread failed at 2.9 tonnes. The strength of the thread was increased to 4.7 tonnes by adding unfilled resin of the same type as the bolt resin, and further increased to 6.1 tonnes by use of a stronger formulation resin containing fibrous reinforcing strands in the threads.

While it was clearly established that the process of our aforesaid specification, of conforming the reinforcement threads close to the thread surface did increase the thread strength, the increase was not as marked as expected, partly because a single shaped reinforcing fibre which is non-linear (as in the thread) loses some of its tensile resistance to strain, and further investigation by the inventors herein has established that, provided the resin of the thread does not have its viscosity increased and strength excessively reduced by filler material, small deformation of the outermost fibres at the locality of the thread will provide almost equal strength to full deformation of those fibres, and when the outer resin of the thread is devoid of large quantities of filler material, a superior result can be achieved. It has been found that some deformation of the outer fibres can be achieved by applying the abovementioned high pressure without the need for any insert in the thread end of the product, and this of course greatly accelerates production methods. The results achieved are very consistent when very high pressure is applied.

With most of the tests which have been undertaken by the Applicant utilising this invention which greatly increases thread strength of the bolts, failure has occurred in the nut rather than in the thread of the bolt, and that failure has been associated with hoop stress. The nuts explode, rather than tearing their threads. Nuts can be made of dough moulding compound or glass filled nylon. As pointed out in the aforesaid Patent Application, a mild steel bolt will accept between 30% and 60% of stress on its first thread, and if the moulded thread is reinforced by reinforcing fibres close to its surface as previously proposed, a similar result might be expected. However with this invention, even if the longitudinal reinforcing fibres do not lie adjacent to the surface of the thread, the lower Youngs Modulus material of the moulded resin will result in a more even distribution of load, and in an embodiment of the invention the thread of either the bolt or the nut, or both, is provided with a resin which has both a higher strength and a higher degree of elongation than the body of the bolt, and this can be achieved for example by having the higher strength resin mix added at the locality of the bolt thread formed with the (more expensive) resin having a 4% to 5% elongation (eg "Derakene" 411 vinyl ester from Dow Chemical) than with the (less expensive) resin used in the body of the bolt having only 2% elongation. Such resins are readily available.

If as in prior art and as in the description contained in that aforesaid previous application, relatively low pressure is used for the moulding, viscosity restraints need to be overcome. It is important to obtain an exact size thread for a nut to fit. If the resin has a high viscosity (due for example to too much filler) the dies will not close, the thread will be oversize, and on the other hand if the viscosity is too low there is insufficient cohesion, excessive expulsion of resin, and the thread recesses in the die will not fill. However in bolt manufacture, resin viscosity varies considerably with temperature, resin viscosity varying typically at room temperature from 500 centipoise for an unfilled resin to as high as 25000 centipoise for filled resin, but this is greatly reduced upon increase in temperature which will occur in heated dies, and can result in a satisfactory thread provided there is sufficient pressure to force the flow of liquid resin into the thread forming recesses of the dies. Thus in any embodiment of this invention the pressure in the press must be sufficient to achieve this. Viscosity variation must be associated with pressure variation.

PRIOR ART

Prior art known to the Applicant exists in an article in the British publication entitled "Journal of Materials Science 20"(1985). An article appears on pages 3311 to 3319 entitled "Time-dependent resistivity in carbon fibre sheets," and tabulates conductivity against carbon fibre fraction (pages 3312 and 3313). Further prior art exists in the Journal of Applied Polymer Science, Vol 29, pages 1639 to 1652 (1984), wherein page 1647 identifies a resistance of about $10^{5.5}$ $\Omega$cm for a 2% w/w carbon fibre content in a peroxide cross-linked polyethylene. No prior art is known to the Applicant wherein less than $10^5$ $\Omega$cm resistivity can be achieved with 0.5% carbon fibres.

BRIEF SUMMARY OF THE INVENTION

Discrete carbon or other electrically conductive fibres are added to a fluid formulation of settable resin in a bath, and a series of tows of non-conductive reinforcing fibres are drawn through the bath, entraining and partly aligning the conductive fibres and being wetted by the resin. The tows are then bunched into a bundle, causing most of the conductive fibres to concentrate in zones outside and between the tows rather than through the tows, so that there is sufficient contact between concentrated conductive fibres in each of the zones, and sufficient number of concentration zones, to achieve an acceptable conductivity with very small quantities of conductive fibres.

In a further embodiment of the invention a bundle of tows of fibreglass wetted with fluid settable resin is drawn through a die cavity of an open die, and a resin mix of stronger formulation containing chopped reinforcing strands is added to the tows at the locality of a thread forming recess in the die, the die is closed, the bundle of tows pinched at one at least of the ends of the die, and the wetted tows and dough subjected to heat and high pressure.

BRIEF DESCRIPTION OF THE DRAWINGS

Embodiments of the invention are described hereunder in some further detail with reference to and are illustrated in the accompanying drawings in which:

FIG. 7 shows the first stage of forming a rock bolt with an extended shank;

FIG. 8 shows a second stage of forming the rock bolt with an extended shank.

DESCRIPTION OF THE PREFERRED EMBODIMENTS

Figure 3:
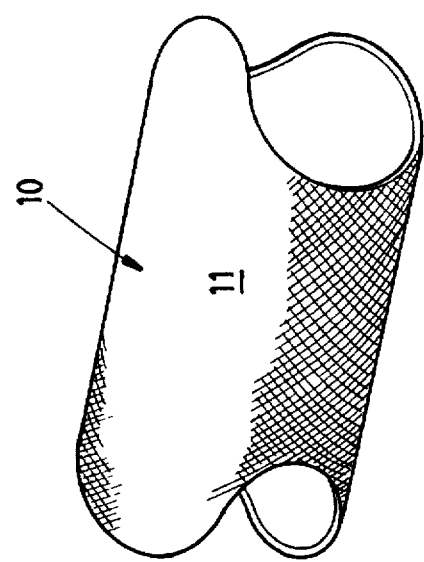
FIG. 3 illustrates a product which has been filament wound and rendered conductive by use of this invention.
Figure 1:
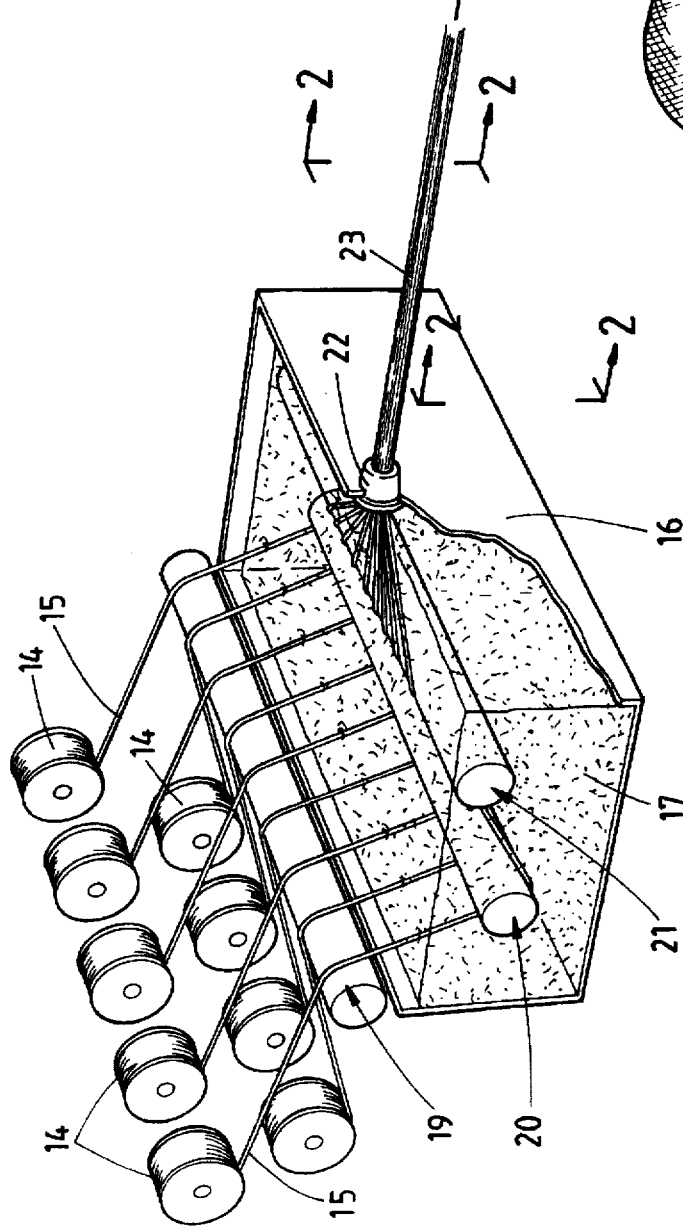
FIG. 1 is a diagrammatic representation of a method of forming an electrically conductive product of non-conductive fibre reinforced plastics containing discrete conductive fibres.
Figure 2:
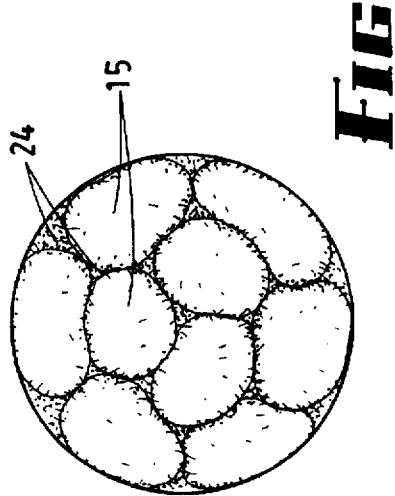
FIG. 2 is a section through a bundle of tows after having been bunched, the section being on plane 2—2—2—2 of FIG. 1 and being to a larger scale.

Referring to FIGS. 1, 2 and 3, a pipe 10 has a filament wound conductive wall 11, so that tows and therefore fibre concentration zones, cross one another diagonally as shown. The invention can be used for many products including containers, and moulded plastics products such as rock bolts.

FIG. 1 illustrates diagrammatically a method of forming a bundle of tows for filament winding a product 10 and utilises a plurality of spools 14 of non-conductive glass reinforcing fibres 15 which are fed into a bath 16 over a curved entry surface 19, the bath 18 containing fluid but settable plastics resin 17 (in this embodiment being a polyester resin) with which is mixed a hardener and a very small quantity of carbon fibres, in this embodiment 0.5% weight to weight (about 0.1% by volume).

The tows of fibre 15 pass downwardly into the bath 16 over an entry curved surface 19, and near the base of the bath and are deflected by the curved surface 20 and are then bunched as they move upwardly from the resin 27 over a second curved surface 21 within the bath to be pulled through the sizing nozzle 22 as the bundle 23, the bundle then comprises the tows of fibres 15 which each is surrounded by concentration zones 24 of the carbon fibres. Stainless steel or other metal fibres can be used in lieu of graphite if required.

A rock bolt which embodied this invention was tested for electrical resistance for the British Coal Corporation by the Sheffield Testing TSRE Non-Metallic Materials Group Laboratories in England. The tests were carried out on five samples each 300 mm (12") in length, using a 500 V DC insulation testing device. Contact strips were positioned symmetrically 100 mm (4") apart, surrounding the bolt. The test was to ascertain if the bolt met anti-static requirements.

The tested rock bolt contained 66 tows of glass 4800 Tex and 1 tow of continuous carbon fibre 417 Tex together with 0.3% w/w on resin content of discrete carbon fibres 6 mm long in a bolt which contained approximately equal parts of reinforcing fibres and resin mix. The resin mix had a ratio of 0.60 parts filler to 1 part resin.

The following results were reported:

| Test No | Resistance in Ohms |
|---------|--------------------|
| 1 | <5 × $10^4$ |
| 2 | 6.5 × $10^4$ |
| 3 | <5 × $10^4$ |
| 4 | 9.7 × $10^4$ |
| 5 | 2.2 × $10^5$ |

Tests 1 and 3 were below the limit of the testing equipment

The above tests were restricted by the equipment which was suitable for electrostatic surface charge leakage tests.

However, corresponding tests were conducted on the bolts from the same production run by the Applicant using a Digital Insulation Tester produced by SANWA of Japan, again a 500 volt device with a 2 MegΩ capacity. Applicant believes the following results to be more accurate than those obtained in England:

In all 5 tests the readings were between 5 and 7 kΩ, being equivalent to 1.8 kΩ cm and 2.6 kΩ cm respectively for a bolt having 368 mm$^2$ cross-sectional area and distances between conductive bands of 101 mm, 102 mm and 109 mm. The readings were much more consistent than those reported to the British Coal Corporation.

In a second test conducted on a short length of a rock bolt of the same dimensions as the first, there was no continuous carbon fibre. The bolt was formed from 65 tows of 4800 Tex fibreglass in a mix which contained only 36 gr discrete carbon fibres and 7600 gr of filler and other additives in 12000 gr of liquid resin (about 0.3% carbon on resin), and this provided a reading of 105 kΩ in a distance between conductive bands of 104 mm length and a cross-section of 368 mm$^2$ area. This is equivalent to 37.15 kΩcm.

In a third test on a short 90 mm distance between conductive bands on a bolt of the same cross-section containing 65 tows of 4800 Tex glass fibre and 0.3% carbon fibre on resin (but no carbon tow) had a resistance of 34.8 kΩ between the conductive bands which provided an equivalent resistance of 14.22 kΩcm.

It was noted that the British tests were much less than standard requirements, and confirming tests much less than the British tests.

Figure 4:
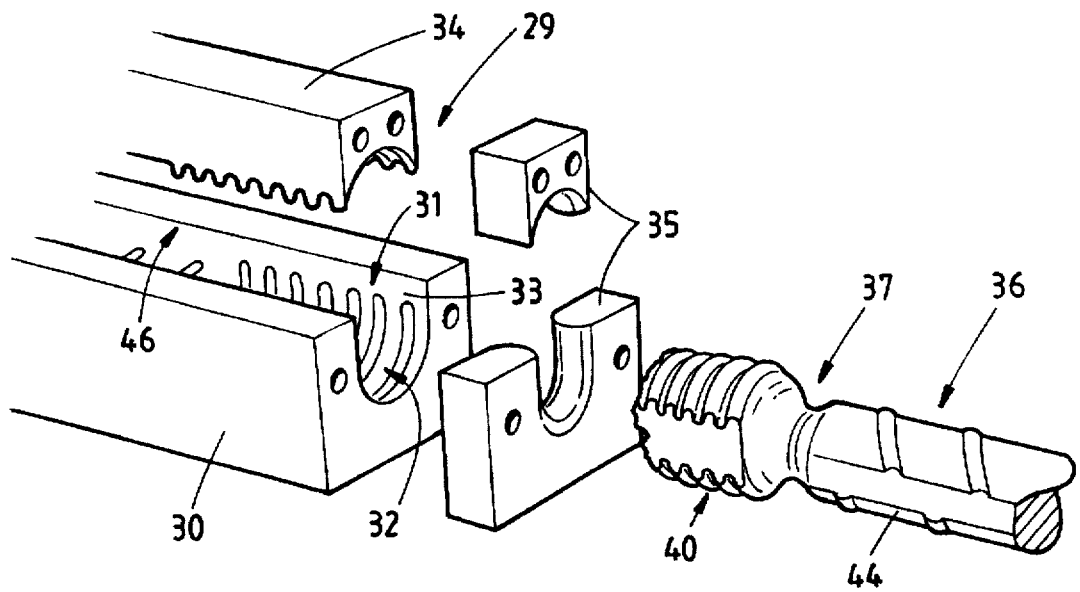
FIG. 4 shows in diagrammatic "exploded" perspective a die arrangement for producing a rock bolt, FIG. 4 illustrating the downstream thread forming end.

In FIG. 4, a die 29 comprises a base 30 having a U-shaped recess 31 with thread forming surfaces 32 therein, the U-shaped recess surface 31 having parallel side walls and these are slidably engaged by complementary side walls 33 of an upper die portion 34. This is substantially in accordance with our aforesaid Patent Application. However the ends of the base 30 and upper die portion 34 are provided with pinching plates 35 which, upon die closure, pinch the workpiece 36 at 37 as illustrated in FIG. 4 and thereby inhibit expulsion of liquid resin or expulsion of fibres (which will occur if the fibres are severed at each end as in prior art). The workpiece comprises a much larger bundle 23 of wetted tows of fibres 15 of non-conducting reinforcing fibres which are drawn between cavities of the die when the die parts are open.

In passing through the bath 16, tows of fibres 15 are flattened firstly by the entry surface 19 and secondly by the curved deflecting surfaces 10 and 21, and this latter reduces inclusion of air and also allows some small quantity of carbon fibres 22 to be captured with various components of direction within the tows themselves, but some of the carbon is caused to be aligned longitudinally with respect to the tows in the concentration zones 24. The carbon fibres are partly aligned as the bundle 23 passes through nozzle 22. The bundle 23 was pressed between the dies and held at about 140° C. until the resin had cured, when it was separated from the dies and withdrawn. High pressure was applied during curing. The pressure exceeded 200 psi (1400 kPa) for viscosity between 500–2000 centipoise at least 500 psi (3500 kPa) for viscosity above 2000 centipoise, and at least 700 psi (5000 kPa) for viscosity above 5000 centipoise.

Additional mix of stronger resin having a greater elongation and containing chopped strand reinforcement is applied between the wetted tows and the thread forming recess surfaces 32, and the die parts are brought together by hydraulic pressure to apply a pressure, which in this embodiment is in the order of 1000 psi, to the projected area of die cavity, and this causes slight deformation of the reinforcing fibres 15 at the locality of the surface 39 of thread 40 (FIG. 5), while the inner reinforcing fibres 40 remain straight. One formulation of the bolt comprises 50 parts by weight of resin, 100 parts reinforcing fibre and 50 parts filler. A typical thread formulation comprises 20 parts of chopped strand glass fibres with 100 parts of resin. This procedure reduces tendency of void formation and provides higher strength than would occur if the filler flowed into the thread forming recesses 32, but the thread is very much stronger if reinforced as described. After moulding, the pinched portion 37 is removed and discarded if only one rock bolt is being produced at a time, as in FIG. 4.

Figure 5:
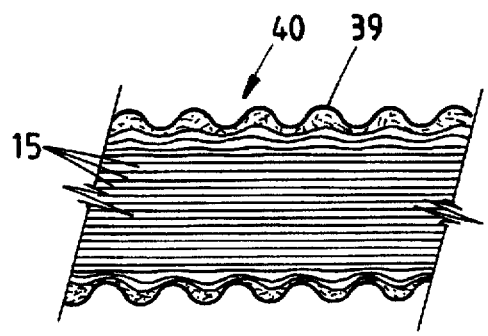
FIG. 5 is a longitudinal section through a thread made in the dies of FIG. 4.

FIG. 5 is a representation of the shapes assumed by the reinforcing fibres when additional resin 39 is utilised as described above to provide a higher strength thread 40. If the outer reinforcing fibres are forced to conform to the thread shape, as in the applicant's aforesaid earlier application, it will be appreciated they need to move longitudinally, but with the method described herein there is less deformation of the outer fibres and the tensile strength of the bolt at the location of the thread 40 is higher than with our earlier said specification.

Figure 6:
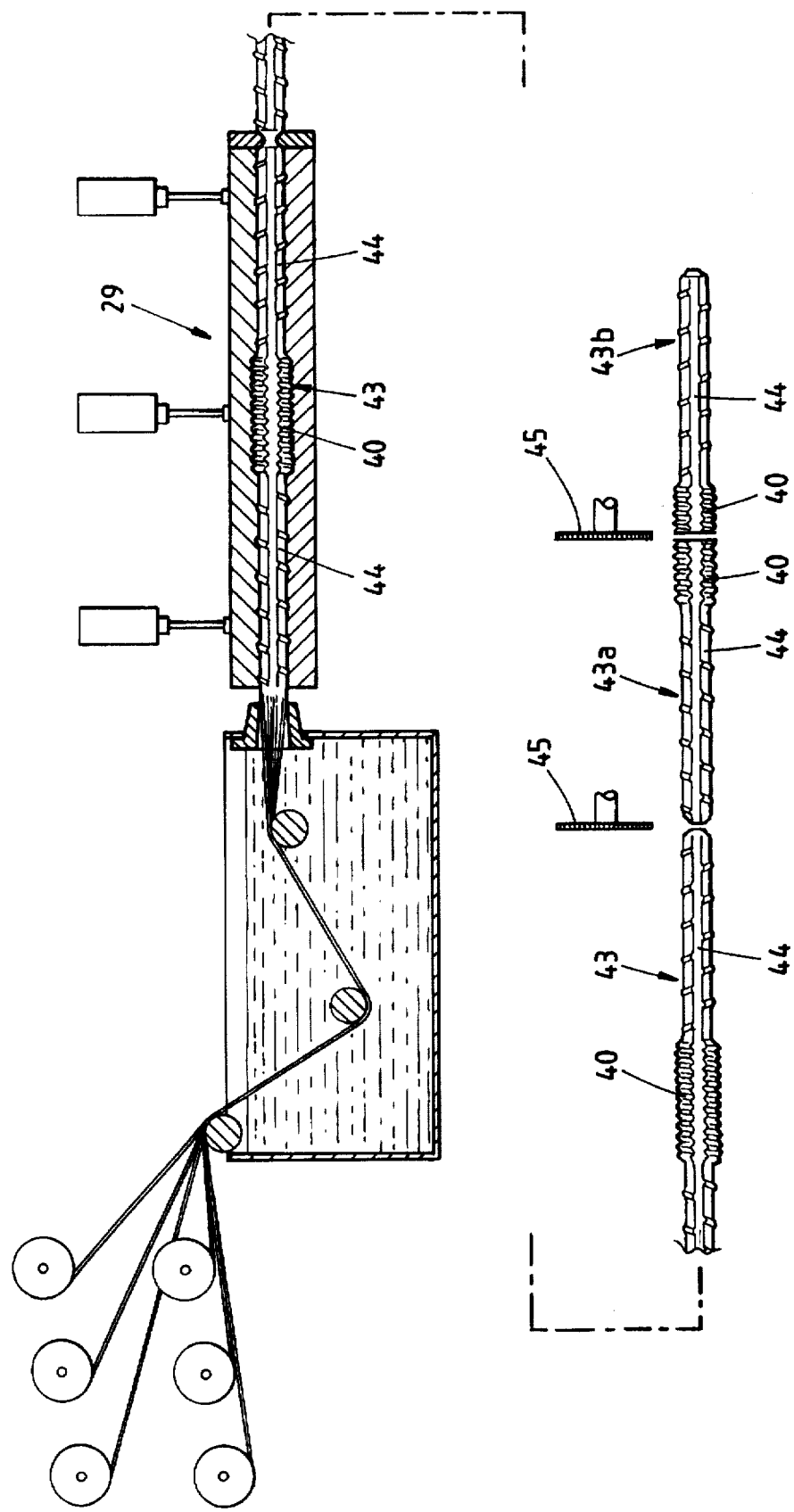
FIG. 6 shows a second embodiment wherein the thread forming surfaces of the die are flanked on each side by shank forming surfaces so that two bolts are formed simultaneously.

For high production rates, it is desirable that the closure of the dies should be as frequent as possible, and FIG. 6 illustrates diagrammatically a production setup.

FIG. 6 illustrates a useful variation of the invention wherein two bolts 43a and 43b are moulded as a single bolt 43 in the die arrangement wherein the bolt shanks 44 flank the thread 40 in the die 29, and are subsequently severed by cutters 45. In other respects the arrangement of FIG. 6 is substantially as the arrangement of FIGS. 1, 2, 4 and 5.

There is frequently a need for small production runs of bolts having shanks longer than can be formed in a single stage operation of a press, and FIG. 7 shows the die 29 partly open and a bolt 43 partially withdrawn, but as shown in FIG. 8, the bolt 43 is not fully removed but part of the shank 44 is located between and matched with the downstream end of the shank forming surfaces 46 of the die 29, and the die 29 is again closed, the shank extension being formed as before by curing the uncured resin in the bundle 23 of tows. Pinching plates similar to plates 35, but defining a larger aperture, can clamp the previously moulded shank, both when moulding short and long bolts. After the extension has been formed, the bolt 43 is fully withdrawn from the die 29 and severed as in the first embodiment. This procedure can be repeated more than once. The upstream end of the die is insulated by plates 47 of polytetrafluoroethylene which inhibits setting of the resin outside the die.

Figure 9:
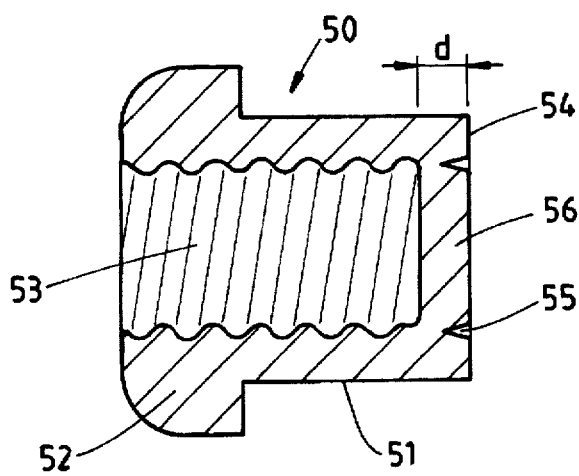
FIG. 9 is a cross-section through a nut.

There is a requirement when inserting a rock bolt into an aperture in a rock wall that the bolt must be tightened only after the resin, which secures it to the rock wall, has set. It is usual to have a frangible portion of a nut which will break at that point, but heretofore consistent results have been difficult to achieve. In FIG. 9, there is illustrated a nut 50 which is provided with a hexagonal spanner portion 51 and a bearing head 52 which bears against a rock face. The internal thread 53 of the nut terminates close to but not at the end 54, and there is provided a sharp edge groove 55 which in FIG. 9 is shown as external but it may be internal, and a close tolerance of the dimension "d" between the inner end of the thread 53 and the bottom of groove 55 is maintained. The groove defines a closure web 56 which is a frangible discoid shaped zone, and the shape and dimensions are such that the web 56 will only break if sufficient torque is applied to the spanner portion 51 after locking of the bolt shank 44 in its receiving aperture by setting of the locking resin therein. A very clean break is achieved, without loss of thread length or damage to the thread or spanner portion. Once the resin has set however, the nut can be further tightened or removed without loss of the effective thread length. This arrangement has been shown to achieve more consistent results than known prior art, as for example, Australian patent applications 52431/86 (579703) Weidmann; 76314/57 (586930) Du Pont; or 74319/74 (487898) Titan.

A consideration of the above factors will also indicate the invention makes possible for the first time known to the Applicant a production method for producing conductive resilient strong rock bolts which meet all criteria presently known at the Applicant and which can be produced for relatively low cost since the bolt shanks can embody large quantities of inexpensive filler. The invention is further applicable to moulded products other than rock bolts wherein conductive polymer products are required.

The claims defining the invention are as follows:

1. A method of forming an electrically conductive product of non-conductive fiber reinforced plastics with a resistivity of less than $10^5$ $\Omega$cm comprising entering a mix of fluid but settable plastics resin material and discrete conductive fibers of carbon or metal into a bath in a weight ratio not exceeding 2% by weight of conductive fibers based upon the weight of resin in said bath, said conductive fibers having a mean aspect ratio exceeding 100, drawing a plurality of tows of nonconductive reinforcing fibers through said bath, wetting said tows with said fluid resin, entraining some of said conductive fibers into concentration zones around said wetted tows, passing the wetted tows over a curved surface, bunching said wetted tows into a bundle, applying said bundle to a shape forming surface, and retaining said tows substantially in contact with said shape forming surface while said resin sets.

2. A method according to claim 1 further comprising passing said bundle of wetted tows through a sizing nozzle and between die cavities of an open die wherein said shape forming surface defines said die cavities and closing said open die and applying pressure to said bundle of wetted tows to conform an envelope shape of said tows to the shape of said surface.

3. A method according to claim 2 wherein a portion of said shape forming surface is a bolt thread forming surface and another portion of said shape forming surface is a bolt shank forming surface of smaller cross-sectional size than the thread forming surface, and further comprising including particulate filler material in said bath, and applying sufficient pressure to said wetted tows to cause flow of resin into contact with said bolt thread forming surface.

4. A method according to claim 2 wherein a portion of said shape forming surface is a bolt thread forming surface and another portion of said shape forming surface is a bolt shank forming surface of smaller cross-sectional size than the thread forming surface, and further comprising applying chopped strand reinforced fluid but settable plastics mix to the wetted tows at the locality of said thread forming surface before said closing of the dies.

5. A method of forming an electrically conductive product of non-conductive fiber reinforced plastics comprising entering a mix of fluid but settable plastics resin material and discrete conductive fibers into a bath in a weight ratio not exceeding 2% by weight of conductive fibers based upon the weight of resin in said bath, said conductive fibers having a mean aspect ratio exceeding 100, drawing a plurality of tows of nonconductive reinforcing fibers through said bath, wetting said tows with said fluid resin, and entraining some of said conductive fibers into concentration zones around said wetted tows, bunching said wetted tows into a bundle, applying said bundle to a shape forming surface, and retaining said tows substantially in contact with said shape forming surface while said resin sets, further comprising passing said bundle of wetted tows through a sizing nozzle and between die cavities of an open die wherein said shape forming surface defines said die cavities and closing said open die and applying pressure to said bundle of wetted tows to conform an envelope shape of said tows to the shape of said surface, wherein a downstream portion of said shape forming surface is a bolt thread forming surface and an upstream portion of said shape forming surface is a bolt shank forming surface of smaller cross-sectional size than the thread forming surface, further comprising forming a bolt with a shank longer than said shank forming surface by firstly forming a bolt with a shank of length equal to the length of the shank forming surface, opening the dies, withdrawing the threaded end outwardly from between the dies thereby drawing further said wetted tows of the bundle between the shank forming cavities of the die, and again closing the die to clamp a portion of said shank and applying pressure to said wetted tows while the resin thereof sets.

6. A method according to claim 1 further comprising including at least one continuous conductive fiber with said bundle of tows in contact with said shape forming surface.

7. A method according to claim 6 further comprising drawing said conductive fiber along with said plurality of tows of non-conductive fibers.

8. A method of forming a molded product of settable resin reinforced with fibers comprising drawing a bundle of tows of reinforcing fibers through a bath comprising fluid but settable resin mix and discrete conductive fibers of carbon or metal, said conductive fibers being present in the bath in an amount ranging from greater than 0 to not greater than 2.0% by weight based upon the weight of resin in said bath, said conductive fibers having a mean aspect ratio exceeding 100, drawing the bundle of tows between die cavities of an open die, closing the die to conform an envelope shape of the tows to the shapes of surfaces which define cavities in the die, and further comprising pinching a portion of the tows of the bundle with a portion of the die to reduce the size of the tows and to radially constrict the die cavities of at least one end of the die sufficiently to inhibit expulsion of resin from that said end, and subjecting a remaining portion of said tows to a high pressure while the resin sets, wherein a product with a resistivity of less than $10^5$ Ωcm is formed.

9. A method according to claim 8 wherein said product is a reinforced plastics bolt and said die cavity surface include thread forming surfaces and shank forming surfaces of smaller cross-sectional area than said thread forming surfaces, further comprising applying further chopped strand reinforced fluid but settable plastics mix to the wetted tows at the locality of the thread forming surfaces before closing the die, the further mix having a formulation which sets to a higher strength and elongation than the first said mix in the bath.

10. A method according to claim 8 wherein said fluid but settable resin mix comprises polyester resin, hardener and particulate filler, and said product is a reinforced plastics bolt and said die cavity surfaces include thread forming surfaces and shank forming surfaces of smaller cross-sectional area than said thread forming surfaces, further comprising applying said pressure to the wetted tows to be sufficiently high to force said resin into close contact with said thread forming surfaces.

11. A method according to claim 10 wherein said thread forming surfaces of the die are flanked on each side by said shank forming surfaces such that two bolts are formed simultaneously in said die, and further comprising severing the so formed bolts from each other after removal from the die.

12. A method of forming a molded product of settable resin reinforced with fibers comprising drawing a bundle of tows of reinforcing fibers through a bath comprising fluid but settable resin mix and between die cavities of an open die, closing the die to conform an envelope shape of the tows to the shapes of surfaces which define cavities in the die forming a bolt with a shank longer than said shank forming surface by firstly forming a bolt with a shank of length equal to the length of the shank forming surface, opening the dies, withdrawing a threaded end outwardly from between the die thereby drawing further said wetted tows of the bundle between the shank forming cavities of the die, and again closing the die to clamp a portion of said shank and apply pressure to said wetted tows while the resin thereof sets, and pinching a portion of the tows of the bundle with at least one end of the die sufficiently to inhibit expulsion of resin from that said end, and subjecting a remaining portion of said tows to a high pressure while the resin sets.

13. An electrically conductive product prepared according to the process of claim 1.

14. A molded product prepared according to the process of claim 8.

15. A method of forming an electrically conductive product of non-conductive fiber reinforced plastics comprising:

forming a bath comprising a mixture of fluid but settable resin material and discrete conductive fibers of carbon or metal, said conductive fibers being present in the bath in an amount ranging from greater than 0 to not greater than 2.0% by weight based upon the weight of resin in said bath, said conductive fibers having a mean aspect ratio exceeding 100, drawing a plurality of tows of nonconductive reinforcing fibers through said bath;

wetting said tows with said resin;

entraining some of said conductive fibers into concentration zones around said wetted tows;

passing said wetted tows over a curved surface;

bunching said wetted tows into a bundle;

applying said bundle to a shape forming surface;

retaining said tows substantially in contact with said shape forming surface while said resin sets; and removing said tows from said shape forming surface as an electrically conductive product with a resistivity of less than $10^5$ Ωcm.

16. The method of claim 15 wherein said conductive fibers are present in an amount not exceeding 0.5% by weight based upon the weight of resin in said bath.

17. The method of claim 1 wherein said conductive fibers are present in an amount not exceeding 0.5% by weight based upon the weight of resin in said bath.

18. The method of claim 8 wherein the tows are pinched at a downstream portion of said die.

19. A rock bolt with threads, the rock bolt being prepared according to the process of claim 1.

20. A rock bolt with threads, the rock bolt being prepared according to the process of claim 8.

* * * * *